United States Patent
Bhaskaran et al.

(10) Patent No.: US 7,668,366 B2
(45) Date of Patent: Feb. 23, 2010

(54) MOSAIC IMAGE DATA PROCESSING

(75) Inventors: Vasudev Bhaskaran, Sunnyvale, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 718 days.

(21) Appl. No.: 11/199,784

(22) Filed: Aug. 9, 2005

(65) Prior Publication Data
US 2007/0041633 A1 Feb. 22, 2007

(51) Int. Cl.
*G06K 9/00* (2006.01)
*G06K 9/32* (2006.01)
*G06K 9/36* (2006.01)
*G06K 9/46* (2006.01)

(52) U.S. Cl. .................. 382/164; 382/277; 382/300

(58) Field of Classification Search ................ 382/162, 382/164, 173, 248, 276, 277, 300, 312, 284; 348/222.1, 231.2, 231.7, 273, 280, 242; 375/240.17, 375/240.18; 358/1.16; 345/698
See application file for complete search history.

(56) References Cited

U.S. PATENT DOCUMENTS

| | | | |
|---|---|---|---|
| 5,889,554 A | 3/1999 | Mutze | |
| 6,516,032 B1 | 2/2003 | Heirich et al. | |
| 6,563,535 B1 | 5/2003 | Anderson | |
| 6,587,602 B2 | 7/2003 | Wakisawa et al. | |
| 6,714,693 B1 | 3/2004 | Miyake | |
| 6,731,397 B1 | 5/2004 | Merrill et al. | |
| 6,791,609 B2 | 9/2004 | Yamauchi et al. | |
| 7,058,219 B2 * | 6/2006 | Walmsley et al. | 382/167 |
| 7,136,541 B2 * | 11/2006 | Zhang et al. | 382/300 |
| 7,142,729 B2 * | 11/2006 | Wredenhagen et al. | 382/300 |
| 7,236,628 B2 * | 6/2007 | Chen et al. | 382/167 |
| 7,260,258 B2 * | 8/2007 | Foote et al. | 382/167 |
| 7,298,929 B2 * | 11/2007 | Akiyoshi et al. | 382/300 |
| 7,352,896 B2 * | 4/2008 | Rantanen et al. | 382/167 |
| 7,379,105 B1 * | 5/2008 | Frank et al. | 348/242 |
| 7,379,626 B2 * | 5/2008 | Lachine et al. | 382/300 |
| 2002/0167602 A1 | 11/2002 | Nguyen | |
| 2003/0016877 A1 | 1/2003 | Baharav et al. | |
| 2004/0046773 A1 | 3/2004 | Inoue et al. | |
| 2004/0196389 A1 | 10/2004 | Honda | |
| 2004/0201721 A1 | 10/2004 | Baharav et al. | |
| 2005/0265631 A1 * | 12/2005 | Mai et al. | 382/284 |
| 2006/0083440 A1 * | 4/2006 | Chen | 382/284 |
| 2007/0041633 A1 * | 2/2007 | Bhaskaran et al. | 382/162 |

\* cited by examiner

*Primary Examiner*—Amir Alavi

(57) ABSTRACT

A method having a corresponding apparatus and computer program comprises receiving a mosaic image comprising a plurality of pixels; separating the mosaic image into a plurality of color channels each comprising only the pixels having a corresponding one of a plurality of colors; and processing each color channel of the image data separately, wherein the processing of each of the color channels comprises at least one of compressing the pixels in the color channel, and color processing the pixels in the color channel.

8 Claims, 9 Drawing Sheets

400

| B | G2 | B | G2 | B | G2 | B | G2 |
|---|----|---|----|---|----|---|----|
| G1 | R | G1 | R | G1 | R | G1 | R |
| B | G2 | B | G2 | B | G2 | B | G2 |
| G1 | R | G1 | R | G1 | R | G1 | R |
| B | G2 | B | G2 | B | G2 | B | G2 |
| G1 | R | G1 | R | G1 | R | G1 | R |
| B | G2 | B | G2 | B | G2 | B | G2 |
| G1 | R | G1 | R | G1 | R | G1 | R |

| r2 | g4 | r3 |    |
|----|----|----|----|
| g3 | B  | G2 | b3 |
| r1 | G1 | R  | g2 |
|    | b1 | g1 | b2 |

FIG. 5

MOSAIC IMAGE DATA PROCESSING

BACKGROUND

The present invention relates generally to data processing. More particularly, the present invention relates to processing image data in mosaic form.

A variety of devices such as mobile phones are now equipped with image sensors such as charge-coupled-devices (CCD). These devices comprise an array of elements, each of which is filtered so as to sense only one color of light, typically red, green or blue. For each element the sensor provides a pixel value representing the intensity of the color of light detected by that element. These pixel values are referred to as "raw data" or "mosaic data." Because images represented by mosaic data (referred to herein as "mosaic images") are not pleasing to the eye, they are "demosaiced" (that is, converted into RGB images) before display. Each pixel in an RGB image is represented by three pixel values, each representing the intensity of one of the respective colors.

In conventional devices, demosaicing is performed before any further image processing, such as color processing, compression and decompression, and image enhancement. One disadvantage of this approach is that, because the volume of RGB data is three times that of mosaic data, more resources are consumed when processing RGB data.

SUMMARY

In general, in one aspect, the invention features a method comprising: receiving a mosaic image comprising a plurality of pixels; separating the mosaic image into a plurality of color channels each comprising only the pixels having a corresponding one of a plurality of colors; and processing each color channel of the image data separately, wherein the processing of each of the color channels comprises at least one of compressing the pixels in the color channel, or color processing the pixels in the color channel.

Some embodiments comprise demosaicing the mosaic image after processing. Some embodiments comprise separately storing the color channels after processing. Some embodiments comprise a program of instructions for performing the method. Some embodiments comprise an apparatus to perform the method. In some embodiments the apparatus is embodied in a mobile phone that also includes a sensor to provide the mosaic image.

In general, in one aspect, the invention features a method comprising: receiving a mosaic image comprising I lines each comprising J pixels; and generating an RGB image based on the mosaic image, wherein the RGB image comprises M lines each comprising N pixels, wherein generating each line of the M lines of the RGB image comprises demosaicing a plurality of lines of the mosaic image, wherein each demosaicing produces a single intermediate line comprising J pixels, scaling each intermediate line to comprise N pixels, and interpolating two of the scaled intermediate lines.

Some embodiments comprise generating interpolation information based on at least one of I and M, or J and N; wherein scaling each intermediate line comprises scaling RGB values for each of the J pixels of the intermediate line based on the interpolation information; and wherein interpolating two of the intermediate lines comprises interpolating RGB values for each corresponding pair of the N pixels of the intermediate lines based on the interpolation information. In some embodiments, the mosaic image employs a Bayer mosaic; and demosaicing the plurality of lines of the mosaic image comprises selecting three consecutive ones of the I lines of the mosaic image, and for each of the J pixels of the second one of the three consecutive ones of the I lines of the mosaic image, generating a corresponding one of the J pixels. Some embodiments comprise a program of instructions for performing the method. Some embodiments comprise an apparatus to perform the method. In some embodiments the apparatus is embodied in a mobile phone that also includes a sensor to provide the mosaic image data.

In general, in one aspect, the invention features a computer program comprising: receiving a mosaic image comprising I lines each comprising J pixels; and generating an RGB image based on the mosaic image, wherein the RGB image comprises M lines each comprising N pixels, wherein generating each line of the M lines of the RGB image comprises demosaicing a plurality of lines of the mosaic image, wherein each demosaicing produces a single intermediate line comprising J pixels, scaling each intermediate line to comprise N pixels, and interpolating two of the scaled intermediate lines.

Some embodiments comprise generating interpolation information based on at least one of I and M, and J and N; wherein scaling each intermediate line comprises scaling RGB values for each of the J pixels of the intermediate line based on the interpolation information; and wherein interpolating two of the intermediate lines comprises interpolating RGB values for each corresponding pair of the N pixels of the intermediate lines based on the interpolation information.

In some embodiments, the mosaic image employs a Bayer mosaic; and demosaicing the plurality of lines of the mosaic image comprises selecting three consecutive ones of the I lines of the mosaic image, and for each of the J pixels of the second one of the three consecutive ones of the I lines of the mosaic image, generating a corresponding one of the J pixels.

The details of one or more implementations are set forth in the accompanying drawings and the description below. Other features will be apparent from the description and drawings, and from the claims.

DESCRIPTION OF DRAWINGS

FIG. 4 shows a mosaic image employing a Bayer mosaic.

FIG. 5 shows a 2×2 superpixel comprising one blue pixel B, one red pixel R, and two green pixels G1 and G2.

Figure 1:
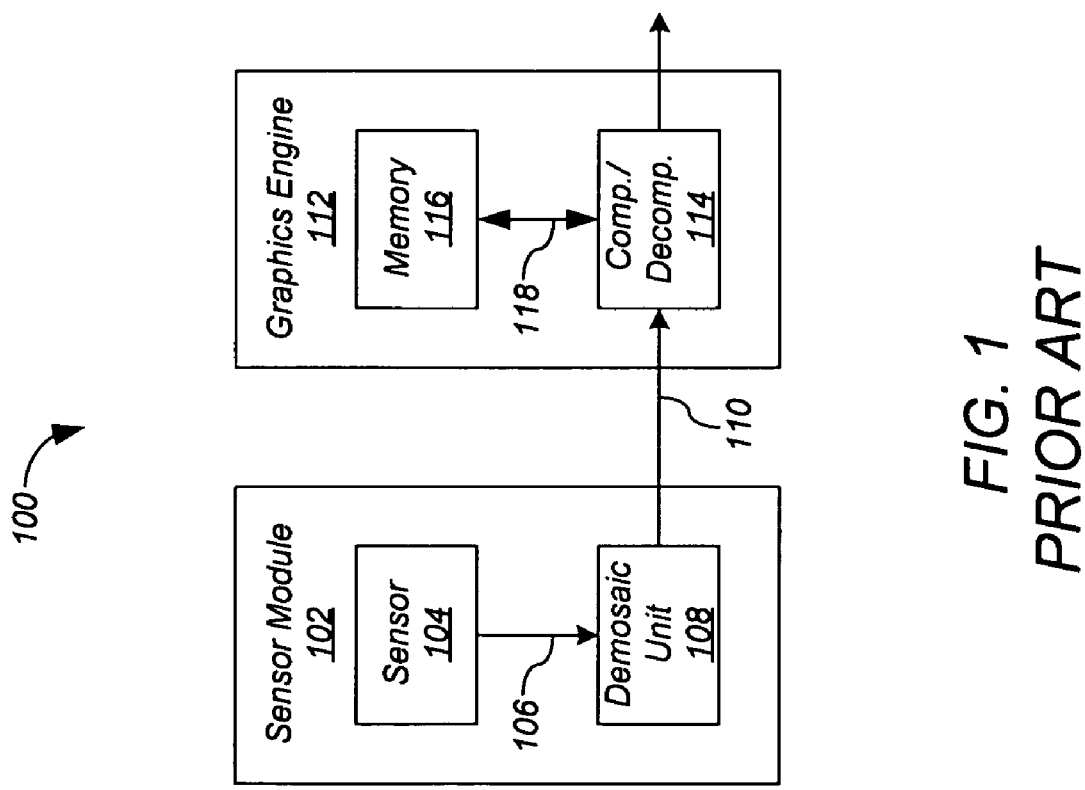
FIG. 1 shows a prior art apparatus such as those available in today's mobile phones.

The leading digit(s) of each reference numeral used in this specification indicates the number of the drawing in which the reference numeral first appears.

DETAILED DESCRIPTION

Embodiments of the present invention process image data in mosaic form before and during, rather than after, demosaicing. According to some embodiments, the mosaic data is compressed before demosaicing. This requires only a fraction of the processing power of compressing RGB data, and allows the image data to be stored in mosaic form, which requires only a fraction of the storage required for RGB data. According to some embodiments, the mosaic data is color-processed before demosaicing. This requires only a fraction of the processing power required to color-process RGB data. According to some embodiments, the resolution of the mosaic data is transformed during demosaicing, which saves processing power and time. While discussed with reference to RGB data and a Bayer mosaic, embodiments of the present invention are easily extended to other color schemes and mosaics.

FIG. 1 shows a prior art apparatus 100 such as those available in today's mobile phones. A sensor module 102 comprises a sensor 104 such as a CCD that produces mosaic data 106, and a demosaic unit 108 that demosaics mosaic data 106 so that sensor module 102 outputs RGB data 110. A separate graphics engine 112 comprises a compression and decompression unit 114 that compresses RGB data 110, and a memory 116 to store the compressed RGB data 118. Compression and decompression unit 114 also decompresses compressed RGB data 118 on retrieval from memory 116 before displaying, printing, or further processing.

Figure 2:
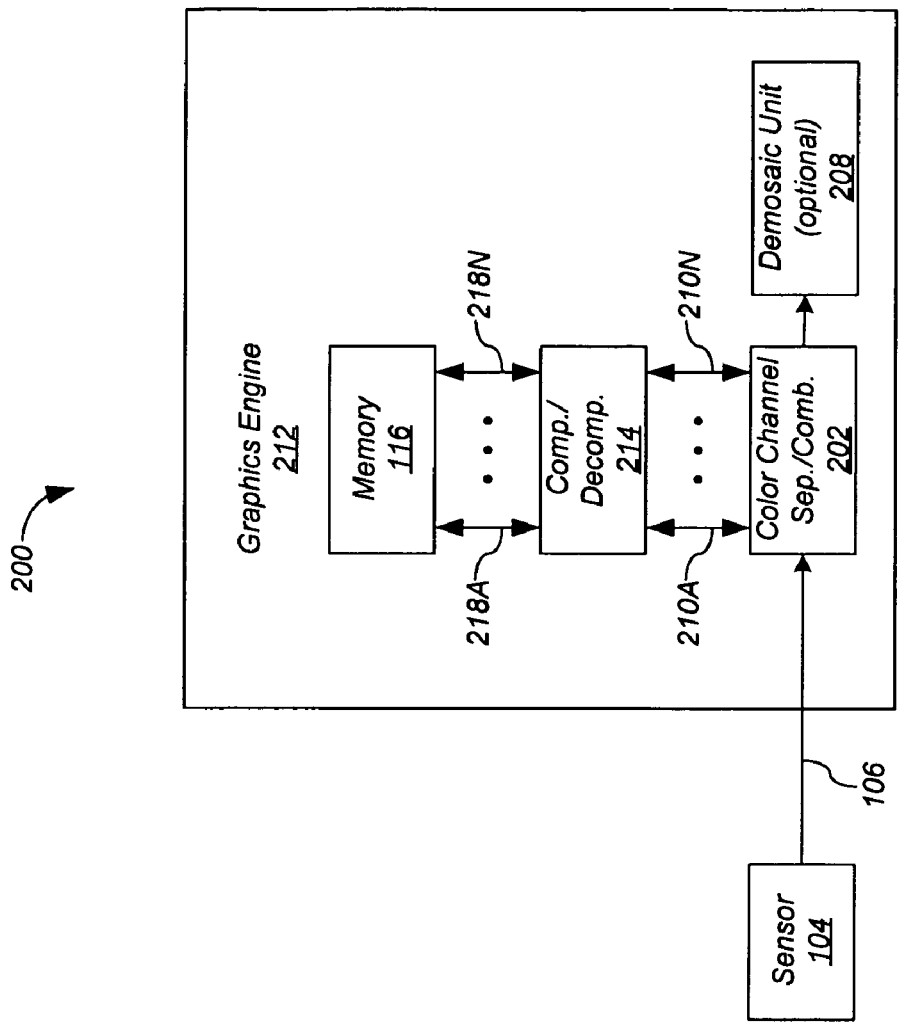
FIG. 2 shows an apparatus that compresses and decompresses mosaic data before demosaicing according to a preferred embodiment.

FIG. 2 shows an apparatus 200 that compresses and decompresses mosaic data before demosaicing according to a preferred embodiment. In some embodiments, apparatus 200 is advantageously implemented in a mobile phone. Apparatus 200 comprises a sensor 104 that produces mosaic data 106 and a graphics engine 212 that processes mosaic data 106. Graphics engine 212 comprises a color channel separator and combiner 202 that separates mosaic data 106 into a plurality of color channels 210A-N, a compression and decompression unit 214 that separately compresses the color channels 210A-N, and a memory 116 for storing the respective compressed color channels 218A-N. Compression and decompression unit 214 also decompresses compressed color channels 218 on retrieval from memory 116. Color channel separator and combiner 202 combines color channels 210 before demosaicing by an optional demosaic unit 208, displaying, printing, or further processing.

Figure 3:
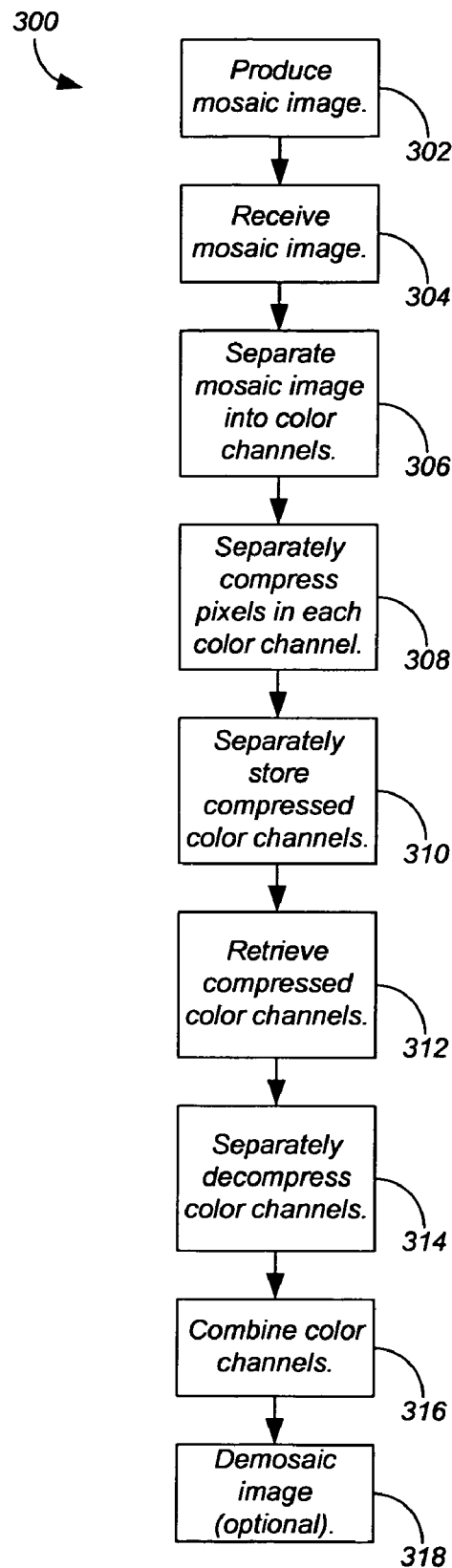
FIG. 3 shows a process for the apparatus of FIG. 2 according to a preferred embodiment.

FIG. 3 shows a process 300 for apparatus 200 of FIG. 2 according to a preferred embodiment. Sensor 104 produces a mosaic image comprising a plurality of pixels in mosaic form (step 302). Graphics engine 212 receives the mosaic image (step 304). FIG. 4 shows a mosaic image 400 employing a Bayer mosaic. In FIG. 4 and throughout this description and the accompanying drawings, the letters R, G, and B are used to denote the colors red, green, and blue.

Color channel separator and combiner 202 separates mosaic image 400 into color channels 210A-N each comprising only the pixels having one of the colors red, green, and blue (step 306). Preferably this separation is performed using 2×2 "superpixels," although superpixels of other dimensions can be used. FIG. 5 shows a 2×2 superpixel comprising one blue pixel B, one red pixel R, and two green pixels G1 and G2. Preferably mosaic image 400 is separated into four color channels 210: one for blue pixels B, one for red pixels R, one for green pixels G1, and one for green pixels G2. FIG. 5 also shows some neighboring pixels r1, r2, r3, g1, g2, g3, g4, b1, b2, and b3, which are used in the optional demosaicing process described below.

Graphics engine 212 processes each color channel separately. Referring again to FIG. 2, compression and decompression unit 214 separately compresses the pixels in each color channel 210 (step 308). By compressing color channels 210 separately, apparatus 200 avoids the color cross-talk error that result from compressing mosaic image 400 directly, thereby permitting high-quality results and high compression ratios. Memory 116 stores compressed color channels 218 separately after processing (step 310).

Before further processing the image, compressed color channels 218 are retrieved from memory 116 (step 312), separately decompressed by compression and decompression unit 214 (step 314), and combined by color channel separator and combiner 202 to again form image 400 (step 316). Mosaic image 400 can then be further processed. For example, optional demosaic unit 208 demosaics mosaic image 400 (step 318).

Preferably demosaic unit 208 employs the following 3×3 linear interpolation technique to demosaic mosaic image 400. Referring again to FIG. 5, the pixels R, G1, G2, and B within each superpixel are used in conjunction with surrounding pixels r1, r2, r3, g1, g2, g3, g4, b1, b2, and b3 to generate the four RGB pixels that correspond to the pixels R, G1, G2, and B within that superpixel. The RGB pixel values for the R pixel are respectively calculated as R, (G1+G2+g1+g2)/4, (B+b1+b2+b3)/4. The RGB pixel values for the G1 pixel are respectively calculated as (r1+R)/2, G1, (B+b1)/2. The RGB pixel values for the G2 pixel are respectively calculated as (r3+R)/2, G2, (B+b3)/2. The RGB pixel values for the B pixel are respectively calculated as (R+r1+r2+r3)/4, (G1+G2+g3+g4)/4, B. Of course, other demosaic techniques can be used instead.

Figure 6:
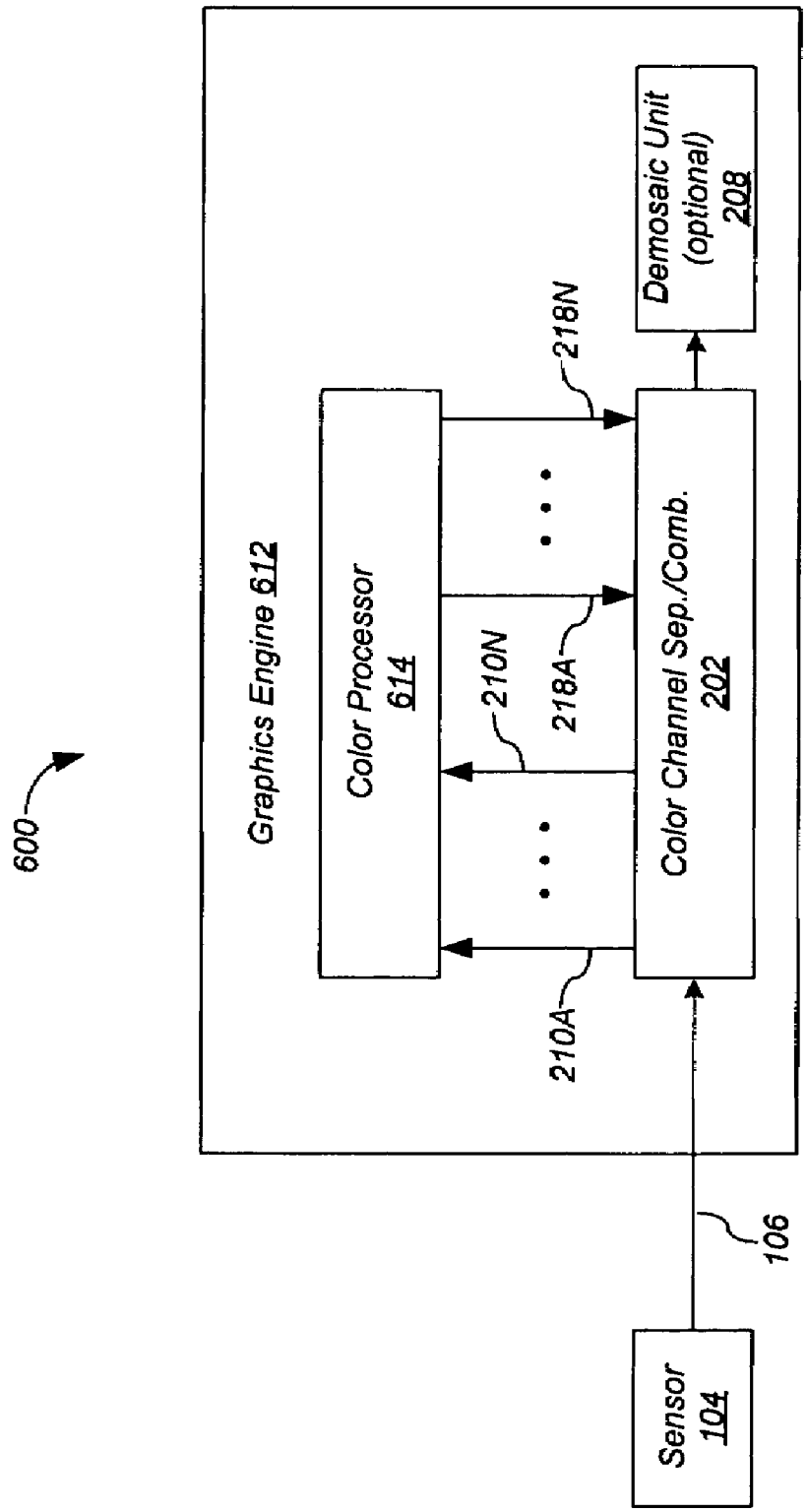
FIG. 6 shows an apparatus that color processes a mosaic image before demosaicing according to a preferred embodiment.

Embodiments of the present invention can perform other sorts of processing upon mosaic image 400 before demosaicing. FIG. 6 shows an apparatus 600 that color processes mosaic image 400 before demosaicing according to a preferred embodiment. In some embodiments, apparatus 600 is advantageously implemented in a mobile phone. Apparatus 600 comprises a sensor 104 that produces mosaic data 106 and a graphics engine 612 that processes mosaic data 106. Graphics engine 612 comprises a color channel separator and combiner 202 that separates mosaic data 106 into a plurality of color channels 210A-N, for example as described above, and a color processor 614 that separately compresses the color channels 210A-N. Color processor 614 is preferably implemented as three one-dimensional look-up tables: one for red pixels R, one for green pixels G1 and G2, and one for blue pixels B. Color channel separator and combiner 202 combines processed color channels 218A-N after color processing and before demosaicing by an optional demosaic unit 208, displaying, printing, or further processing.

Figure 7:
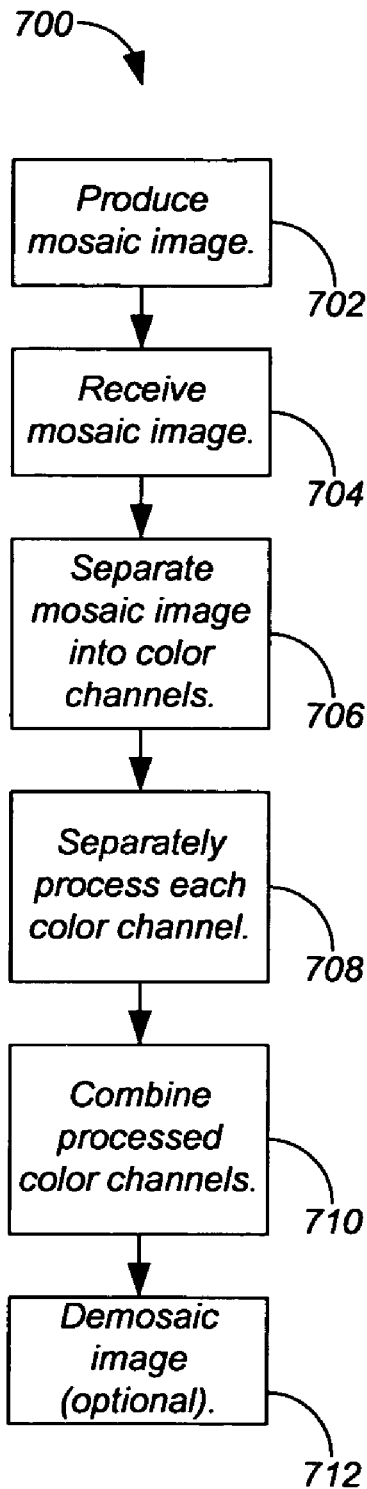
FIG. 7 shows a process for the apparatus of FIG. 6 according to a preferred embodiment.

FIG. 7 shows a process 700 for apparatus 600 of FIG. 6 according to a preferred embodiment. Sensor 104 produces a mosaic image 400 comprising a plurality of pixels in mosaic form (step 702). Graphics engine 612 receives mosaic image 400 (step 704).

Color channel separator and combiner 202 separates mosaic image 400 into color channels 210A-N each comprising only the pixels having a corresponding one of a plurality of colors (step 706). Preferably this separation is performed using 2×2 "superpixels" as described above, although superpixels of other dimensions can be used.

Graphics engine 612 processes each color channel separately. Referring again to FIG. 6, color processor 614 separately color processes the pixels in each color channel 210 (step 708), for example according to well-known color processing techniques such as enhancing contrast, brightness, and white balance, and correcting hue.

Before further processing the image, color-processed color channels 618 are combined by color channel separator and combiner 202 to again form image 400 (step 710). Mosaic image 400 can then be further processed. For example, demosaic unit 208 demosaics mosaic image 400 (step 712), for example using the 3×3 linear interpolation technique described above.

Figure 8:
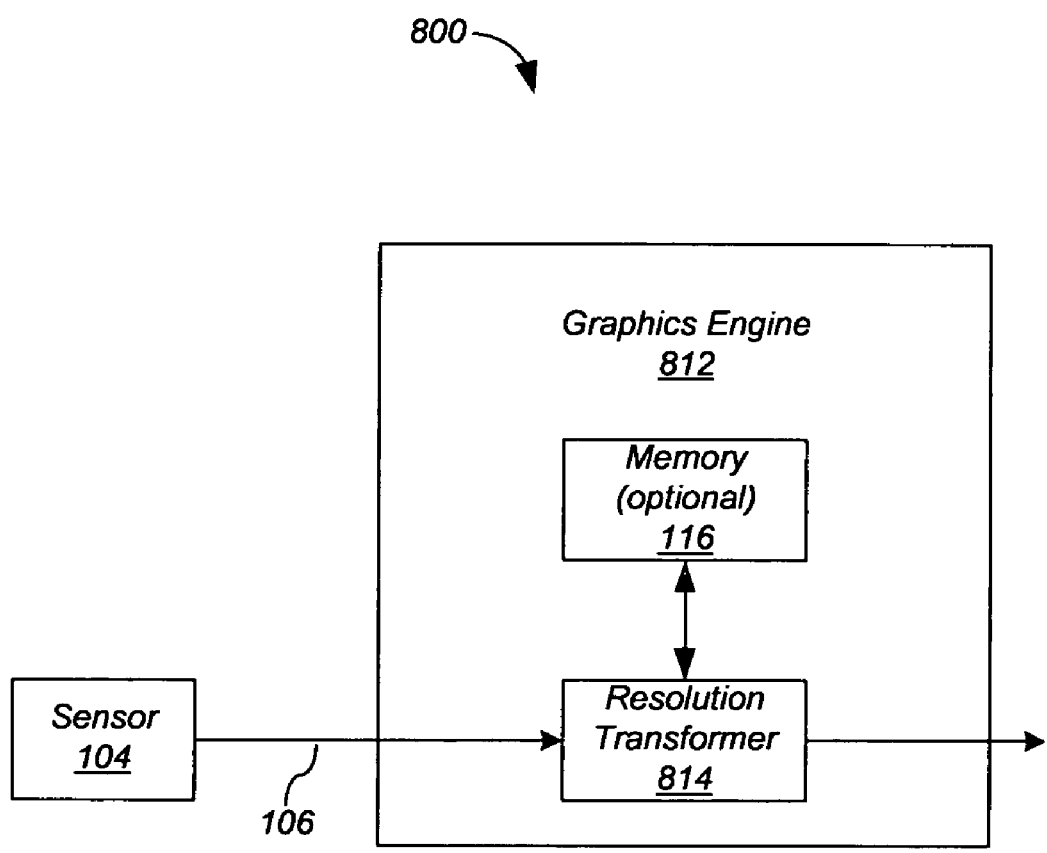
FIG. 8 shows an apparatus that transforms the resolution of mosaic image during demosaicing according to a preferred embodiment.

FIG. 8 shows an apparatus 800 that transforms the resolution of mosaic image 400 during demosaicing according to a preferred embodiment. In some embodiments, apparatus 800 is advantageously implemented in a mobile phone. Apparatus 800 comprises a sensor 104 that produces mosaic data 106 and a graphics engine 812 that processes mosaic data 106. Graphics engine 812 comprises a resolution transformer 814 and an optional memory 116. Mosaic data 106 can be stored in optional memory 116. The resulting resolution-transformed demosaiced image can be stored in optional memory 116 as well.

Figure 9:
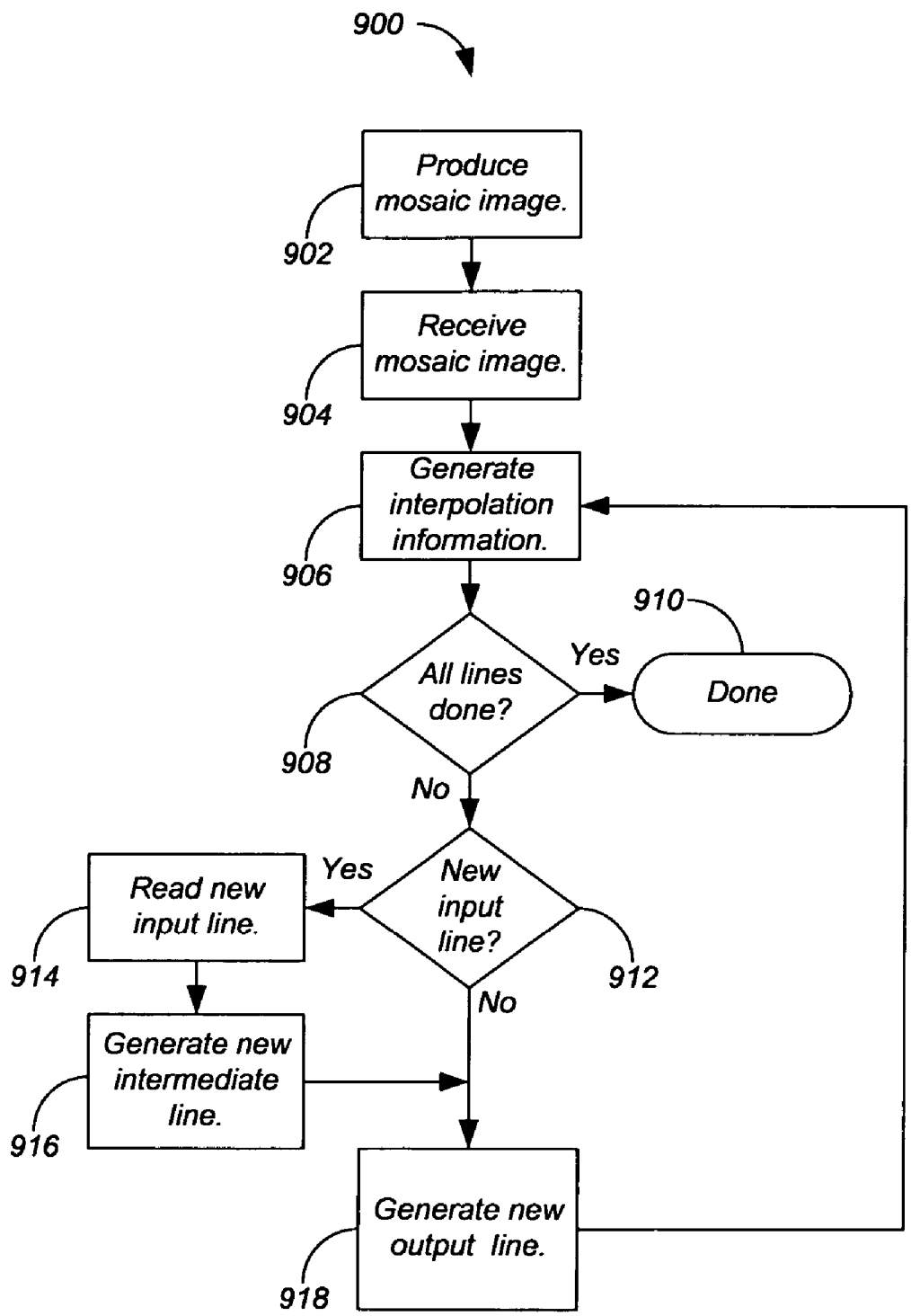
FIG. 9 shows a process for the apparatus of FIG. 8 according to a preferred embodiment.

FIG. 9 shows a process 900 for apparatus 800 of FIG. 8 according to a preferred embodiment. Sensor 104 produces a mosaic image 400 comprising I lines each comprising J pixels in mosaic form (step 902). Graphics engine 812 receives mosaic image 400 (step 904). Process 900 converts mosaic image 400 to an RGB image comprising M lines each comprising N pixels. Although in the described embodiments, I=J and M=N, these embodiments are easily extended to images where this is not the case, as will be apparent to one skilled in the relevant arts after reading this description.

Process 900 generates interpolation information based on the values of I and M (step 906). When I=J, this interpolation information is used for both horizontal and vertical interpolation. When I≠J, this interpolation information is used for horizontal interpolation only, and process 900 generates additional vertical interpolation information based on the values of J and N. The interpolation information preferably comprises two vectors, a position vector and an offset vector, which are preferably stored in two respective one-dimensional look-up tables for rapid access. To calculate these vectors, first a scaling factor SF is calculated according to SF=M/I. In addition, to permit the use of integers rather than floating-point numbers in the calculations, a normalization is selected, for example normalization=1024.

Then preferably an iterative loop is used to generate the vectors according to the following code:

```
for (k=0; k<M; k++)
{
    k_p = corresponding input pixel location as a floating
        point number = = (float)k / SF;
    k_left = Truncation of k_p = corresponding input pixel location as
        an integer
    left_position[k] = k_left;
    offset_from_left[k] = (k_p - k_left) * normalization = the distance
from the involved left pixel in integer in the range of [0, normalization];
}
```

The position vector comprises the values of left_position [k]. The offset vector comprises the values of offset_from_left[k]. Of course, other techniques can be used to generate the same or different interpolation information. When M/I≠N/J, two position vectors and two offset vectors are required, one of each for the horizontal axis, and one of each for the vertical axis.

After generating the interpolation information, process 900 generates the output RGB image, one line at a time and in sequence, either from top to bottom or bottom to top. Process 900 generates an intermediate RGB line comprising I pixels based on three consecutive lines of the input image, scales the intermediate line to the width of the output image (M pixels) using the interpolation information, and then vertically interpolates two of the M-pixel intermediate lines to obtain the output line, as described in detail below.

Process 900 first determines whether all of the N lines of the output RGB image have been generated (step 908). If yes, then process 900 ends (step 910). But if any output lines remain to be generated, process 900 determines whether a new line of the input image is required to generate the current output line (step 912). Preferably this determination is made using the position vector where I=J, or using the vertical position vector where I≠J. If a new line of the input image is required, process 900 reads a new line of the input image (step 914), and generates a new intermediate line based on the three most recently-read lines of the input image (step 916).

Figure 10:
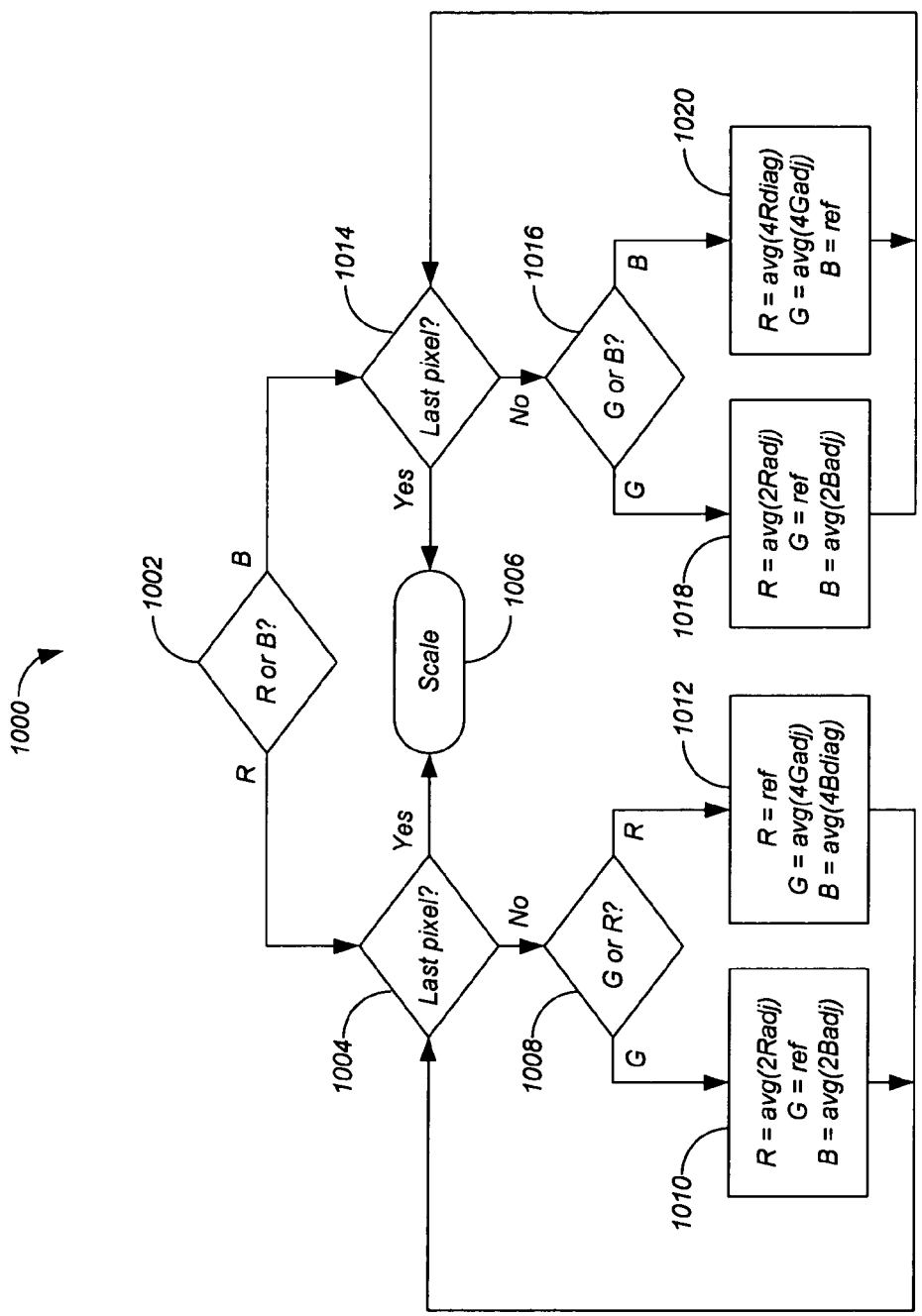
FIG. 10 shows a process for generating an intermediate line from three consecutive lines of the input image according to a preferred embodiment.

FIG. 10 shows a process 1000 for generating an intermediate line from three consecutive lines of the input image according to a preferred embodiment. While one process for generating an intermediate line is described, others can be used, for example with mosaics other than Bayer. In a Bayer mosaic, every line comprises green pixels, but each line also comprises either red pixels or blue pixels, but not both red and blue pixels, as is well-known in the relevant arts. Process 1000 first determines whether the second of the three consecutive input lines comprises red pixels or blue pixels (step 1002). If the line comprises red pixels, then process 1000 generates each pixel of the intermediate line according to the color of the corresponding pixel of the second input line (hereinafter referred to as the "reference pixel") as described below. Process 1000 determines whether the last pixel of the intermediate line has been generated (step 1004). If so, the intermediate line is scaled to the width of the output image (step 1006), for example as described in detail below.

But if a pixel of the intermediate line remains to be generated, process 1000 determines whether the reference pixel is green or red (step 1008). If green, then the RGB values of the corresponding pixel of the intermediate line are calculated as follows (step 1010). The pixel values of the two red pixels adjacent to the reference pixel in the second input line are averaged to obtain the red pixel value of the output pixel (R=avg(2Radj)). The pixel value of the reference pixel is taken as the green pixel value of the output pixel (G=ref). The pixel values of the two blue pixels adjacent to the reference pixel (in the first and third input lines) are averaged to obtain the blue pixel value of the output pixel (B=avg(2Badj)).

But if at step 1008 the reference pixel is red, then the RGB values of the corresponding pixel of the intermediate line are calculated as follows (step 1012). The pixel value of the reference pixel is taken as the red pixel value of the output pixel (R=ref). The pixel values of the four green pixels adjacent to the reference pixel (in the first and third input lines) are averaged to obtain the green pixel value of the output pixel (G=avg(4Gadj)). The pixel values of the four blue pixels nearest the reference pixel (in the first and third input lines) are averaged to obtain the blue pixel value of the output pixel (B=avg(4Bdiag)). Process 1000 then resumes at step 1004.

But if at step 1002 the second of the three consecutive input lines comprises blue pixels, then process 1000 generates each pixel of the intermediate line according to the color of the reference pixel by the process that follows. Process 1000 determines whether the last pixel of the intermediate line has been generated (step 1014). If so, the intermediate line is scaled to the width of the output image (step 1006), for example as described in detail below.

But if a pixel of the intermediate line remains to be generated, process 1000 determines whether the reference pixel is green or blue (step 1016). If green, then the RGB values of the corresponding pixel of the intermediate line are calculated as follows (step 1018). The pixel values of the two red pixels adjacent to the reference pixel (in the first and third input lines) are averaged to obtain the red pixel value of the output pixel (R=avg(2Radj)). The pixel value of the reference pixel is taken as the green pixel value of the output pixel (G=ref). The pixel values of the two blue pixels adjacent to the reference pixel in the second input line are averaged to obtain the blue pixel value of the output pixel (B=avg(2Badj)).

But if at step 1016 the reference pixel is blue, then the RGB values of the corresponding pixel of the intermediate line are calculated as follows (step 1020). The pixel values of the four red pixels nearest the reference pixel (in the first and third input lines) are averaged to obtain the red pixel value of the output pixel (R=avg(4Rdiag)). The pixel values of the four green pixels adjacent to the reference pixel (in the first and third input lines) are averaged to obtain the green pixel value of the output pixel (G=avg(4Gadj)). The pixel value of the reference pixel is taken as the blue pixel value of the output pixel (B=ref). Process 1000 then resumes at step 1004.

Once generated according to the above steps of process 1000, the intermediate line is scaled to the width of the output image (step 1006), for example according to the linear interpolation process that follows. The interpolation process first saves the previous scaled intermediate line as line_scale_h[0], and then interpolates the current intermediate line line_scale_h[0] linearly to the output image width, for example according to the following code:

```
line_scale_h[0][j] = line_scale_h[1][j];
line_scale_h[1][j] = (intermediate_line[left_position[j]] *
    (normalization - offset_from_left[j]) +
    intermediate_line[left_position[j] + 1]] *
    offset_from_left[j] ) / normalization;
Process 1000 is then complete.
```

Referring again to FIG. 9, process 900 generates a line of the output image (step 918) based on the current intermediate line line_scale_h[0] and the previous intermediate line line_scale_h[1][j], for example using linear interpolation, for example according to the following code:

```
For the i_out line,
Output_line [j] = (line_scale_h[0][j] *
    (normalization - offset_from_left[i_out]) +
    line_scale_h[1][j] *
    offset_from_left[i_out])) / normalization;
```

Process 900 then resumes at step 906, repeating until all of the lines of the output image are generated.

Embodiments of the present invention can be implemented in digital electronic circuitry, or in computer hardware, firmware, software, or in combinations of them. An apparatus of the invention can be implemented using a program of instructions (e.g., computer program) tangibly embodied in a machine-readable storage medium for execution by a programmable processor; and method steps of the invention can be performed by a programmable processor executing a program of instructions to perform various functions of the invention by operating on input data and generating output. Aspects of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices or mediums suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Computer program instructions can also be embodied in a suitable electromagnetic carrier wave (waveform) that is conveyed to a programmable processor. Program instructions for implementing aspects of the invention can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method, comprising:
   using a processor to perform the steps of:
   receiving a mosaic image comprising I lines each comprising J pixels;
   performing non-demosaicing operations on the mosaic image, including separating the mosaic image into separate color channels and compressing the mosaic image; and thereafter;
   generating an RGB image based on the mosaic image, wherein the RGB image comprises M lines each comprising N pixels, wherein generating each line of the M lines of the RGB image comprises
      demosaicing a plurality of lines of the mosaic image, wherein each demosaicing produces a single intermediate line comprising J pixels,
      scaling each intermediate line to comprise N pixels, and interpolating two of the scaled intermediate lines.

2. The method of claim 1, further comprising:
   generating interpolation information based on at least one of
   I and M, or
   J and N;
   wherein scaling each intermediate line comprises scaling RGB values for each of the J pixels of the intermediate line based on the interpolation information; and
   wherein interpolating two of the intermediate lines comprises interpolating RGB values for each corresponding pair of the N pixels of the intermediate lines based on the interpolation information.

3. The method of claim 1:
   wherein the mosaic image employs a Bayer mosaic; and
   wherein demosaicing the plurality of lines of the mosaic image comprises selecting three consecutive ones of the I lines of the mosaic image, and for each of the J pixels of the second one of the three consecutive ones of the I lines of the mosaic image, generating a corresponding one of the J pixels.

4. An apparatus configured to perform the method of claim 1, the apparatus including the processor.

5. A mobile phone comprising the apparatus of claim 4, the mobile phone further comprising:

a sensor to provide the mosaic image data.

6. A computer-readable medium containing a program of instructions adapted to control a processor to perform a processing algorithm, the program of instructions comprising instructions for:

receiving a mosaic image comprising I lines each comprising J pixels;

performing non-demosaicing operations on the mosaic image, including separating the mosaic image into separate color channels and compressing the mosaic image; and thereafter;

generating an RGB image based on the mosaic image, wherein the RGB image comprises M lines each comprising N pixels, wherein generating each line of the M lines of the RGB image comprises demosaicing a plurality of lines of the mosaic image, wherein each demosaicing produces a single intermediate line comprising J pixels, scaling each intermediate line to comprise N pixels, and interpolating two of the scaled intermediate lines.

7. The computer-readable medium of claim 6, further comprising:

generating interpolation information based on at least one of

I and M, or

J and N;

wherein scaling each intermediate line comprises scaling RGB values for each of the J pixels of the intermediate line based on the interpolation information; and wherein interpolating two of the intermediate lines comprises interpolating RGB values for each corresponding pair of the N pixels of the intermediate lines based on the interpolation information.

8. The computer-readable medium of claim 6:

wherein the mosaic image employs a Bayer mosaic; and wherein demosaicing the plurality of lines of the mosaic image comprises selecting three consecutive ones of the I lines of the mosaic image, and for each of the J pixels of the second one of the three consecutive ones of the I lines of the mosaic image, generating a corresponding one of the J pixels.

* * * * *